United States Patent [19]

Cambridge

[11] Patent Number: 5,248,855
[45] Date of Patent: Sep. 28, 1993

[54] GRAVITY SENSING DIGITIZING STYLUS

[75] Inventor: Vivien J. Cambridge, Slidell, La.

[73] Assignee: Automated Decisions, Inc., Smyrna, Ga.

[21] Appl. No.: 863,220

[22] Filed: Apr. 3, 1992

[51] Int. Cl.$^5$ .............................................. G08C 21/00
[52] U.S. Cl. ......................................... 178/18; 178/20
[58] Field of Search ............................... 178/18, 19, 20

[56] References Cited

U.S. PATENT DOCUMENTS

| | | | |
|---|---|---|---|
| 3,376,551 | 4/1968 | Armbruster | 340/172.5 |
| 3,528,295 | 9/1970 | Johnson et al. | 73/432 |
| 4,246,439 | 1/1981 | Romein | 178/19 |
| 4,263,592 | 4/1981 | Takahashi et al. | 340/707 |
| 4,318,096 | 3/1982 | Thornburg et al. | 340/706 |
| 4,577,057 | 3/1986 | Blesser | 178/19 |
| 4,580,007 | 4/1986 | Searby et al. | 178/18 |
| 4,883,926 | 11/1989 | Baldwin | 178/18 |
| 4,975,546 | 12/1990 | Craig | 178/19 |
| 5,061,828 | 10/1991 | Purcell | 178/18 |

Primary Examiner—Stafford Schreyer
Attorney, Agent, or Firm—Ross, Howison, Clapp & Korn

[57] ABSTRACT

A digitizing stylus for use with a tablet for measuring the angle between a gravity vector and the longitudinal axis of the barrel of the stylus for calculating pitch angle and barrel rotation of the stylus includes a housing having an electrolytic solution. A plurality of electrodes are disposed within the housing and extend into the electrolytic solution. The electrodes generate an output signal based upon the distance the electrodes extend into the electrolytic solution. A sensor is interconnected to the plurality of electrodes for sensing changes in the output signals for computing pitch angle and rotation of the stylus.

3 Claims, 2 Drawing Sheets

GRAVITY SENSING DIGITIZING STYLUS

TECHNICAL FIELD OF THE INVENTION

This invention relates to digitizing styli, and more particularly to a digitizing stylus for use with a tablet system for measuring pitch and roll of the stylus with respect to the tablet.

BACKGROUND OF THE INVENTION

A conventional digitizing stylus and tablet system measures the movement of a hand-held stylus with respect to the tablet surface and converts the movement to x and y coordinates. In this fashion, movement of a hand-held stylus across a tablet surface can be used to position images on a computer screen. The x and y coordinates are measured via signals transmitted between the stylus and the tablet surface or between the stylus and an external sensing unit. A third degree of freedom is available in some digitizing systems wherein pressure applied to the stylus tip generates an additional signal corresponding to the z axis direction, perpendicular to the tablet surface.

It is often desirable to detect more than these three degrees of freedom (x, y and z) in order to increase control and editing capabilities in a videographic system. In some advanced stylus and tablet systems, known as 6-D systems, the stylus can detect pitch, roll, and yaw in addition to x, y, and z degrees of freedom. However, a 6-D system requires the addition of expensive electromagnetic sensors in the barrel of the stylus and additional sensing units to monitor the output signals. This additional equipment, while adding functionality, also adds to both the complexity and cost of the total system.

A need thus exists for an economical videographic stylus system having more than three degrees of freedom.

SUMMARY OF THE INVENTION

The present invention provides for an economical, yet effective digitizing stylus and tablet system which enables a computer graphics user to interactively manipulate graphics images and control screen editing on a computer screen via manipulation of a hand-held stylus, where the stylus contains a sensor which measures the direction of a gravity vector relative to the longitudinal axis of the stylus to compute the pitch and roll of the stylus barrel.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
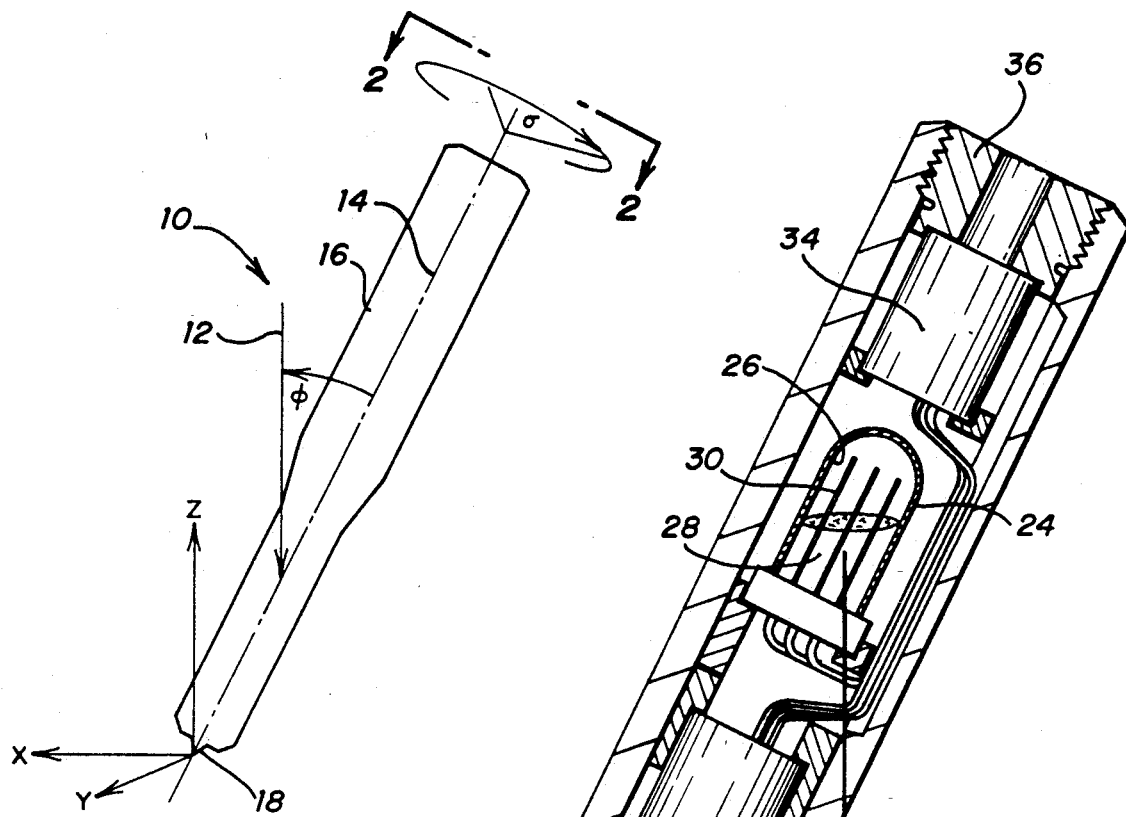
FIG. 1 is a side elevational view of the present digitizing stylus.

Referring to FIG. 1, the present invention includes a stylus 10, and uses the angular difference between the direction of the gravity vector 12 and the longitudinal axis 14 of the stylus barrel 16 to determine the pitch, $\phi$, and roll, $\sigma$, of the stylus 10. The angle between the gravity vector 12 and the longitudinal axis 14 of the stylus 10 represents the pitch angle of the stylus. In addition, if the pitch angle of the stylus is significant, changes in the radial component of the gravity vector, i.e. the component perpendicular to the longitudinal axis 14 of the stylus 10, are related to the roll of the barrel of the stylus. Since a stylus 10 is usually tilted from the vertical as it rests in a user's hand during normal operation, the pitch angle is usually significant, and the present invention allows a user to generate output signals related to roll of the stylus barrel 16 by rolling the stylus in his/her hand. With the present invention, a user can vary the output produced by the stylus to control and edit graphics images by changing the pitch angle between the stylus and the tablet and by rolling the barrel of the stylus, in conjunction with the lateral movement of the stylus which produces outputs related to x-y movement as usual.

Stylus 10 further includes a tip 18 which moves on the surface of a tablet for generating x and y coordinate data with respect the tablet. Tip 18 further generates z axis coordinate data through the use of a pressure sensor.

Figure 2:
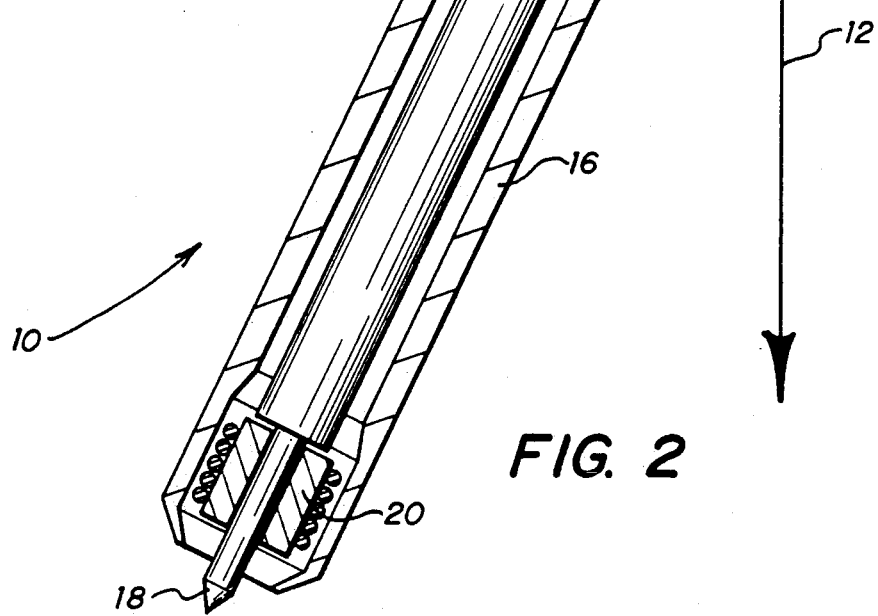
FIG. 2 is a sectional view taken generally along sectional lines 2—2 of FIG. 1 illustrating the present digitizing stylus.

FIG. 2 illustrates the interior of housing or barrel 16. Stylus 10 includes a conventional electromagnetic induction coil 20 used to determine the x and y position of the stylus 10 on a tablet. Stylus 10 also includes a pressure sensitive stylus tip 18 to measure pressure along the z axis. In addition to electromagnetic technology, various other methods exist for measuring x and y coordinates of the stylus such as, for example, electrostatic technology. The technology for measurement and use of these parameters (x, y, z) in videographic stylus systems is well known to those skilled in the art.

Figure 3:
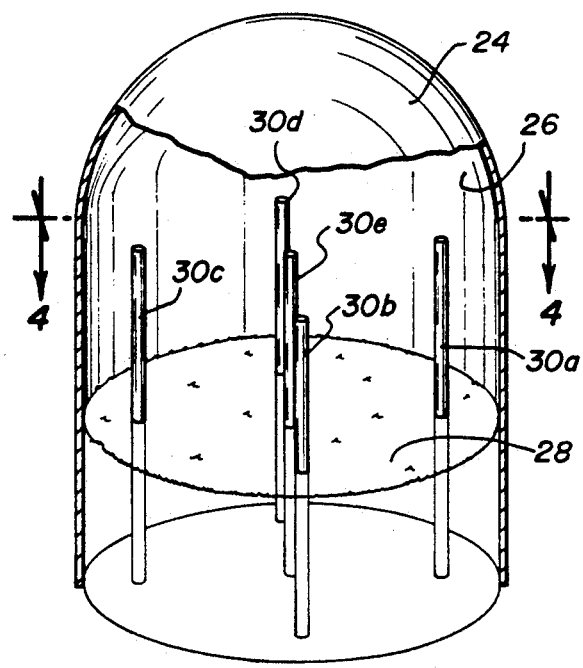
FIG. 3 is a side elevational view, partially in section, illustrating the tilt sensor utilized with the present invention.
Figure 4:
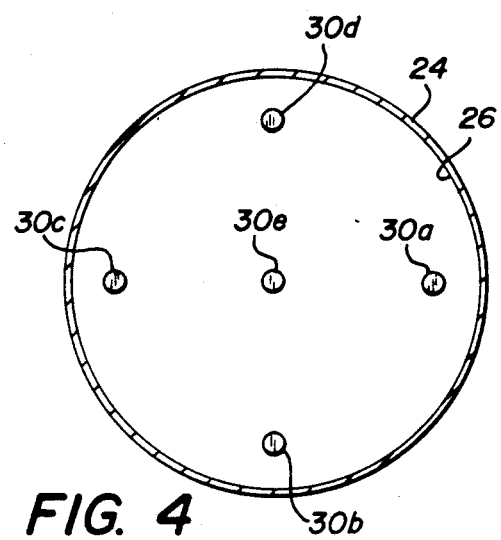
FIG. 4 is a sectional view taken generally along sectional lines 4—4 of FIG. 3.

To measure pitch and roll, the present invention measures the direction of the gravity vector 12 relative to the barrel 16 of the stylus 10 by using a tilt sensor 24. Tilt sensor 24 includes an enclosed vessel 26 partially filled with an electrolytic liquid 28. The sensor 24 includes electrodes 30a-e which extend vertically into the electrolyte as shown in FIGS. 3 and 4. Electrode 30e is located along the vertical center line of the vessel 26 and electrodes 30a-d are located on mutually perpendicular axes. For purposes of reliability and redundancy, the preferred embodiment includes five electrodes, it being understood that the present stylus can function with only two electrodes located on different horizontal axes, and one electrode along the center line of vessel 26.

Figure 5:
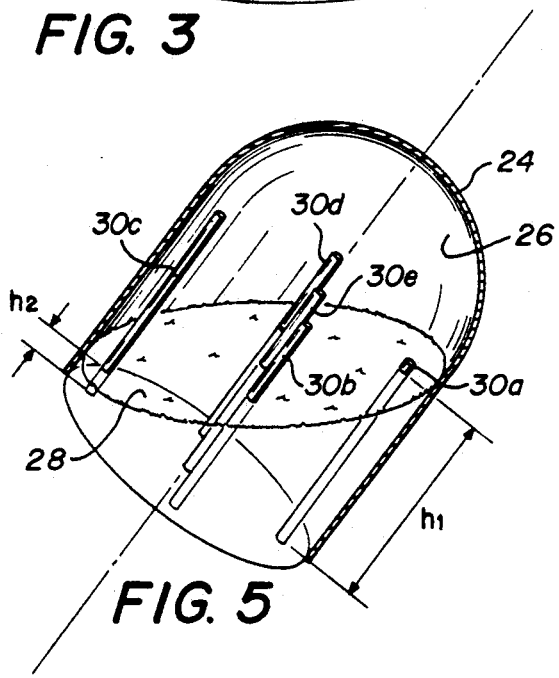
FIGS. 5 and 6 are side elevational views of the tilt sensor demonstrating the roll of the stylus.
Figure 6:
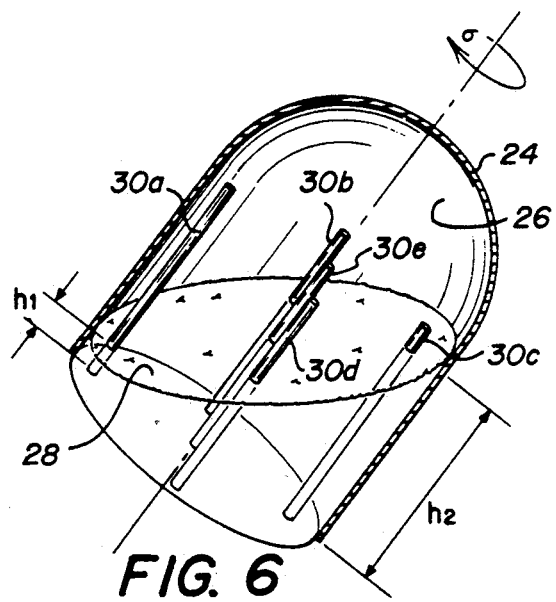
Figure 7:
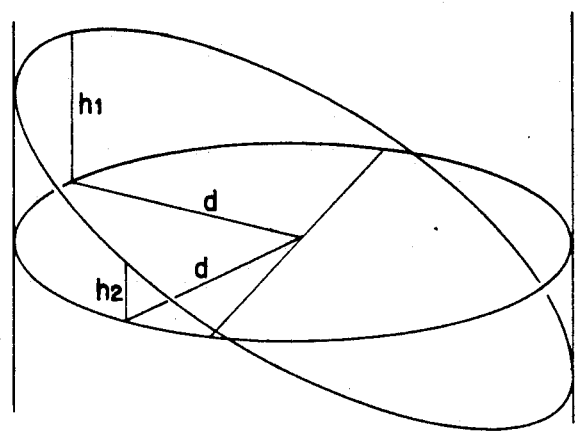
FIG. 7 is a diagrammatic illustration depicting the geometry utilized to determine expressions for pitch and roll.

The sensor 24 also includes circuitry 34 for inducing a voltage across the electrolytic fluid 28. Circuitry 34 is interconnected to circuit 36 for transferring data between stylus 10 and a videographic system. The voltage indicated by each electrode 30a-e is a function of the level of the electrolyte contacting that electrode. For example, in FIG. 5, the voltage reading across electrode 30a is greater than the voltage reading across electrode 30c. If the pitch angle φ of the sensor 24 is changed, the electrolyte level on each electrode 30a-e changes and the voltage reading across the electrodes 30a-e changes accordingly. The respective voltage outputs from the electrodes relate to height of the electrolyte at each electrode. As shown in FIGS. 5-7, electrodes 30a and 30c, are a radial distance d from the center of the vessel 26 and the angle between the radial lines through these electrodes is 90 degrees. As FIGS. 5 and 6 also indicate, the height differentials of the electrolyte at these electrodes are respectively h1 and h2. For the geometry and distances described above, it can be shown that the pitch angle φ of the stylus 10 is given by the expression:

$$\phi = \tan^{-1}[(h1^2 + h2^2)^{1/2}/d] \quad [1]$$

If the pitch angle of the stylus 10 is significant, then the voltage outputs of the electrodes 30a-e are different. For example, in FIG. 5, electrode 30c, which has less of the electrode surface immersed in the electrolyte 28, would show lower voltage than electrode 30a. If the vessel 26 is rotated around its longitudinal axis, corresponding to axis 14, the voltage outputs of the electrodes 30a-e continue to vary as a function of the changing electrolyte levels covering each electrode. As shown in FIG. 6, electrode 30a would show a lower voltage than electrode 30c.

Therefore, if the vessel 26 is incorporated in a stylus which is tilted in the course of normal hand-held use, it is possible to detect the rotation of the vessel 26 as well as its pitch. Given the geometry and distances described above, it can be shown that the roll angle σ of the stylus 10 is given by the expressions:

$$\sigma = \tan^{-1}[h2/h1] \text{ if } h1 \geq 0 \quad [2]$$

$$\sigma = \tan^{-1}[h2/h1] + \pi \text{ if } h1 < 0 \quad [3]$$

Approximations to the expressions of equations [1], [2] and [3] can be coded into a look-up-table for more efficient operation of the system or calculated using a microprocessor.

Although the stylus of the present invention senses five dimensions rather than six dimensions as do the 6-D electromagnetic styli, the present invention provides all of the dimensions which are practically useful in interactive screen editing and object manipulation while providing a far simpler technology, manufactured at lower cost.

The stylus of the present invention is ideal for electronic painting systems and similar computer graphics applications, as it provides x, y, pressure, pitch angle, and barrel roll. For example, a user can turn a paintbrush in a computer graphics paint program by rolling the stylus and can change the size of the paintbrush by changing the pitch of the stylus relative to the tablet. The present invention is also useful in the interactive control of graphics objects displayed on a computer display screen. The stylus may also be useful in multimedia and audio computer applications.

Whereas the present invention has been described with respect to specific embodiments thereof, it will be understood that various changes and modifications will be suggested to one skilled in the art. For instance, certain sub-parts of the present system may be merged without appreciably changing the functionality of the system. It is intended to encompass such changes and modifications as fall within the scope of the appended claims.

I claim:

1. A digitizing stylus comprising:
   a housing having a longitudinal axis;
   sensing means disposed within said housing for measuring the direction of a gravity vector relative to said longitudinal axis of said housing; and
   means responsive to said sensing means for determining pitch angle and rotation of said housing.

2. The digitizing stylus of claim 1 wherein said sensing means includes:
   a subhousing containing an electrolytic solution;
   a plurality of electrodes disposed within said subhousing and extending into said electrolytic solution based upon the position of said housing with respect to the vertical gravity vector;
   said electrodes generating an output signal based upon the distance said electrodes extend into said electrolytic solution; and
   sensing means interconnected to said plurality of electrodes for sensing changes in said output signals of said plurality of electrodes and for computing pitch angle and rotation of said housing.

3. The digitizing stylus of claim 2 wherein said means responsive to said sensing means includes means for calculating pitch angle as $\tan^{-1}[(h1^2 + h2^2)^{1/2}/d]$; and
   roll angle as $\tan^{-1}[h2/h1]$ if $h1 \geq 0$; and
   roll angle as $\tan^{-1}[h2/h1] + \pi$ if $h1 < 0$
   where h1 and h2 represent height differentials for two of said plurality of electrodes where said height differentials are the difference in height of the electrolytic solution on said electrodes from the level state to the tilted state of said housing.

* * * * *